Patented Dec. 22, 1942

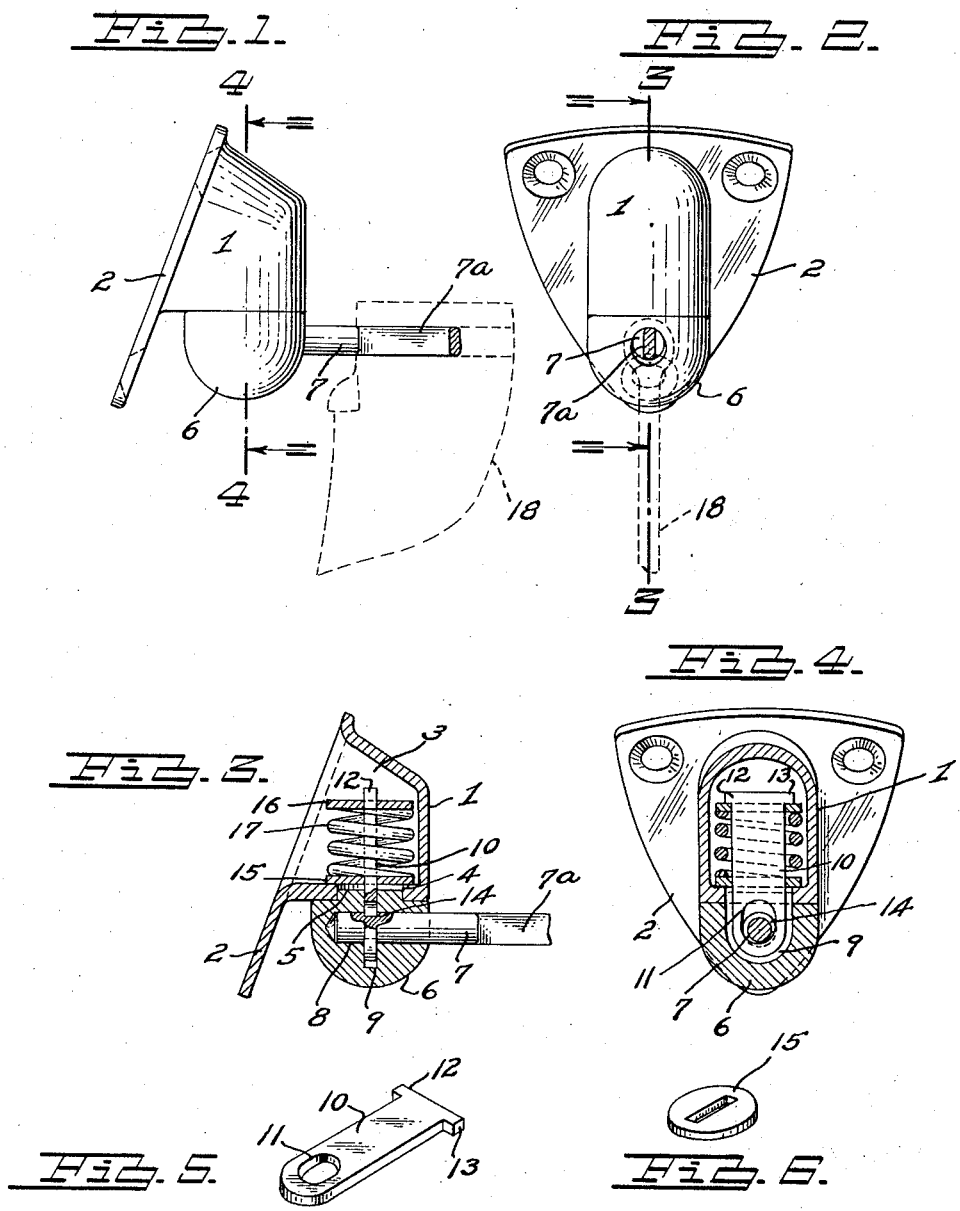

2,305,584

UNITED STATES PATENT OFFICE 2,305,584

BRACKET FOR VISOR

Thomas J. Arbron, Royal Oak, Mich., assignor to Capac Manufacturing Company, Capac, Mich., a corporation of Michigan Application July 23, 1941, Serial No. 403,673

5 Claims. (Cl. 248—278)

This invention relates to brackets for mounting a visor to the interior of an automobile body and the object of the invention is to provide a bracket for the support of the rod or arm carrying the visor of such construction as to permit the arm and visor to be turned about a vertical axis and to permit the arm or rod to be turned on its longitudinal axis under tension resisting such movement.

It is common practice heretofore to provide a visor that rotates on the supporting arm and to remain in a set position due to the frictional resistance to rotation between the arm and the visor elements and the important feature of this invention is, therefore, to provide an arm that is rotatable in the bracket and under such restraint to rotation as to maintain the visor in its adjusted position.

These and other objects and features of the invention are hereinafter more fully described and claimed and the preferred form of construction of a visor bracket embodying my invention is shown in the accompanying drawing in which—

Fig. 1 is a side elevation showing the preferred form of the bracket.

Fig. 2 is an elevation taken from the right side of Fig. 1.

Fig. 3 is a vertical section on line 3—3 of Fig. 2.

Fig. 4 is a vertical section taken on line 4—4 of Fig. 1.

Fig. 5 is a perspective view of the rod retainer element.

Fig. 6 is a perspective view of a form of washer used with the retainer.

In its preferred form the bracket comprises a body 1 having a flange 2 providing a base for securing the same to the interior wall of the automobile and is here shown as angularly disposed to the vertical but it is to be understood that this angular disposition of the flange 2 can be varied to correspond to the plane of the surface to which the bracket is to be attached. The body 1 is formed with a recess 3 the bottom horizontal wall of which is provided with an aperture 4 of circular form to receive the circular projection 5 provided on the knuckle or boss 6. The visor rod 7 has an end supported in a cylindrical recess 8 of the boss or knuckle 6 which is also formed with a slot 9 opening through the circular projection 5. In the slot 9 is the rod retainer 10 having an elongated aperture or slot 11 at one end and is formed at the opposite to provide a head formed by the projecting lugs 12 and 13. The apertured end of the rod retainer is introduced into the slot 9 of the boss 6 and the circular end of the rod 7 is formed with a peripheral groove 14 engaging in the aperture 11 of the retainer. On the retainer 10 is a washer 15 slotted to permit the same to be introduced on the retainer 10 and a second washer 16 is likewise slotted to permit the same to be passed onto the body of the retainer. Between these washers is a coiled spring 17 under compression and tending to force the retainer 10 upwardly in the position of the parts shown in Fig. 3 to cause the lower end of the slot 11 to tightly engage in the groove 14 in the rod and thus frictionally resist rotation of the rod but permitting the rod to be turned by the visor indicated by dotted lines 18 in Fig. 1.

It is to be understood that the end portion 7 of the rod is cylindrical in form and rotatable in the aperture 8 of the boss 6. The remaining portion 7a of the rod is of flat form or of out-of-round shape and the channel therefor in the visor is similarly shaped so that by grasping the free edge of the visor the visor and rod may both be turned as a unit on the rod axis and will be sustained in any of its possible positions about the said axis by the pressure applied thereto by means of the spring 17 and the retainer 10. The width of the slot 11 is sufficient to permit the rod ends to be introduced thereinto when the spring is compressed to position the slot 11 in alignment with the rod and to permit this movement of the retainer 10 the slot 9 in the boss 6 is of such depth as to permit the retainer to be moved downwardly from the position shown in Fig. 2 to align the slot 11 with the end 8 of the rod.

With the parts in the assembled relation shown in Fig. 2 the rod 7 may be turned in a plane cutting its longitudinal axis and also may be rotated in the boss and retainer thereby enabling the visor to be desirably positioned to provide a shield from sun glare. By the structure described a single spring is utilized to place both the boss 6 and rod under pressure resisting rotation.

It is believed obvious from the foregoing description that the various features and objects of the invention may be obtained by the structure and arrangement of parts described and it is also to be understood that various changes may be made in the structure without departing from the spirit and scope of the appended claims.

Having thus fully described my invention, its utility and mode of operation, what I claim and desire to secure by Letters Patent of the United States is:

1. A bracket for the purpose described, comprising a body having a base portion adapted for attachment to a support and formed with a recess opening through the base, the bottom wall of said recess having a cylindrical aperture, a boss having a cylindrical projection fitting the aperture and a peripheral shoulder engaging the said bottom wall, said boss having an aperture opening through one side thereof below the shoulder, a visor rod for engaging in the said aperture, and a retainer preventing longitudinal movement of the rod and frictionally resisting rotation thereof, said retainer comprising a metal element having a slot of a width slightly greater than the diameter of the rod end and of a length greater than the diameter of the rod end and said rod end having a peripheral groove, and spring means tending to move the retainer and thereby cause a portion of the wall forming the slot to engage in the groove of the rod under pressure thereby preventing longitudinal movement of the rod and permitting rotation under restraint by the pressure between the rod and retainer 2. A bracket for the purpose described comprising a body member having a base adapting the same for attachment to a support and formed with a recess opening through the base, the bottom wall of the recess having a cylindrical aperture, a boss rotatably fitting the aperture and having a shoulder engaging the outer face of the bottom wall, said boss having an aperture extending thereinto at an angle to its axis of rotation and further having a slot extending thereinto from the said cylindrical portion at a right angle to and extending beyond the first named aperture, a visor rod having a cylindrical end portion fitting in the said first named aperture of the boss, and a retainer element slidably fitting in the slot of the boss, a spring tending to draw the said retainer from the slot, and means on the retainer frictionally engaging the rod end when positioned in the boss and frictionally resisting rotation thereof by the pressure of the spring.

3. A bracket for the purpose described comprising a body having a portion thereof adapting the same for attachment to a support, said body having a recess, the bottom wall of which is provided with a cylindrical aperture, a boss having a portion thereof rotatably fitting the aperture, and a shoulder fitting the outer surface of said bottom wall, said boss having an aperture extending thereinto at an angle to its axis of rotation, a visor rod having an end engaging in the boss aperture, a spring retracted means extending into the boss from the said body recess to frictionally engage the rod and resist rotation thereof and support the boss with its shoulder in pressure engagement with the said bottom wall.

4. A visor supporting bracket comprising a hollow body adapted for attachment to a support, the bottom wall of the body having an aperture, a rotatable element having a portion in rotatable relation in the aperture in said wall and having an aperture at a right angle to its axis of rotation, a visor rod rotatably mounted in the said aperture of the rotatable element, a spring actuated means within the said body having a portion thereof extending through an aperture in the rotatable element on substantially its axis of rotation and engaging the rod, and providing a means for resisting rotation of both the rod, and the rotatable element.

5. A visor supporting bracket comprising a body adapted for attachment to a support, a rotatable element supported by the body and having an aperture extending thereinto at an angle to its axis of rotation, a visor rod in rotatable relation in said aperture and spring actuated means for applying pressure to the rod and to the rotatable element to yieldably resist rotation thereof.

THOMAS J. ARBRON.